US012643203B2

(12) United States Patent
Brown et al.

(10) Patent No.: US 12,643,203 B2
(45) Date of Patent: Jun. 2, 2026

(54) VACUUM SUPPORT SYSTEM AND APPARATUS

(71) Applicant: The Boeing Company, Arlington, VA (US)

(72) Inventors: Michael G. Brown, House Springs, MO (US); Michael S. Heuschober, Mesa, AZ (US); Kevin Thomas Ostrega, Wentzville, MO (US)

(73) Assignee: The Boeing Company, Arlington, VA (US)

(*) Notice: Subject to any disclaimer, the term of this patent is extended or adjusted under 35 U.S.C. 154(b) by 348 days.

(21) Appl. No.: 18/482,092

(22) Filed: Oct. 6, 2023

(65) Prior Publication Data

US 2025/0114914 A1 Apr. 10, 2025

(51) Int. Cl.
*B25B 11/00* (2006.01)

(52) U.S. Cl.
CPC .................................. *B25B 11/005* (2013.01)

(58) Field of Classification Search
CPC ...... B25B 11/005; B24B 41/06; B24B 41/068
See application file for complete search history.

(56) References Cited

U.S. PATENT DOCUMENTS

| | | | | |
|---|---|---|---|---|
| 4,253,631 | A * | 3/1981 | Sherman | G03B 27/64 248/363 |
| 11,046,532 | B1 | 6/2021 | Borowicz | |
| 11,417,560 | B2 * | 8/2022 | Scholz-Goerlach | B41F 15/20 |
| 2022/0184754 | A1 * | 6/2022 | Nakamura | B23P 15/00 |

* cited by examiner

*Primary Examiner* — Jason L Vaughan
*Assistant Examiner* — Amanda Kreiling
(74) *Attorney, Agent, or Firm* — Yee & Associates, P.C.

(57) ABSTRACT

A vacuum support system and vacuum support apparatus to support and maintain one or more workpieces via application of negative pressure. The vacuum support system includes a vacuum source and a vacuum support apparatus to support one or more workpieces thereon. The vacuum support apparatus includes a base frame and a cover member supported on the base frame. The base frame has a recessed region for fluidic communication with the vacuum source, and one or more support members arranged in the recessed region. The cover member has a gripping support surface to anchor one or more workpieces thereon via negative air pressure induced in the recessed region by the vacuum source.

20 Claims, 10 Drawing Sheets

VACUUM SUPPORT SYSTEM AND APPARATUS

FIELD

A vacuum support system and vacuum support apparatus to support and maintain one or more workpieces via application of negative pressure.

BACKGROUND

Some manufacturing processes include a vacuum gripping device to anchor, grip, or otherwise maintain one or more workpieces such as a tool or part in an assembly line. Some vacuum gripping devices have designs that are limited to support of a single workpiece, thus sometimes requiring several vacuum gripping devices to support several workpieces. Other vacuum gripping devices have complex configurations, and thus, increased fabrication costs. Still other designs fail to adequately maintain the vacuum in a manner that anchors the workpiece on the support surface. Yet and still, some vacuum gripping devices have designs that, lacks a vacuum seal pattern that conforms to a workpiece having an irregular shape.

SUMMARY

In an exemplary embodiment, a vacuum support system and vacuum support apparatus includes an enhanced design that maintains negative pressure therein in a manner that anchors one or more workpieces (even irregular-shaped workpieces) thereon.

In an exemplary embodiment, a vacuum support apparatus comprises one or more of the following: a base frame having a recessed region for fluidic communication with a vacuum source and one or more support members arranged in the recessed region; a cover member supported on the base frame, the cover member having a gripping support surface to support and maintain or otherwise anchor one or more workpieces thereon via negative air pressure induced in the recessed region by the vacuum source.

In accordance with the vacuum support apparatus, the base frame comprises one or more sidewalls and a bottom wall that define the recessed region.

In accordance with the vacuum support apparatus, the one or more sidewalls are operable to support the cover member at a periphery of the vacuum support apparatus and the one or more support members are operable to support the cover member at the recessed region.

In accordance with the vacuum support apparatus, the base frame is formed from a nonporous material.

In accordance with the vacuum support apparatus, an upper peripheral surface of the base frame includes one or more grooves sized to receive one or more seal members in a manner which establishes a seal between the base frame and the cover member.

In accordance with the vacuum support apparatus, the one or more support members and the bottom wall of the base frame comprise an integrally-formed monolithic structure.

In accordance with the vacuum support apparatus, the one or more support members extend from an interior surface of the bottom wall.

In accordance with the vacuum support apparatus, the one or more support members are spatially oriented in the recess region to extend vertically from the interior surface of the bottom wall of the base frame in a manner which facilitates engaged contact with the bottom interior surface of the cover member to thereby provide support of the cover member.

In accordance with the vacuum support apparatus, the one or more support members are spaced apart from each other to form an array that influences the negative pressure induced in the recessed region by the vacuum source.

In accordance with the vacuum support apparatus, the one or more support members have different structural configurations.

In accordance with the vacuum support apparatus, the one or more support members have the same structural configuration.

In accordance with the vacuum support apparatus, one or more baffle members are arranged in the recessed region to enhance the negative pressure effect induced in the recessed region by the vacuum source.

In accordance with the vacuum support apparatus, the one or more baffle members have a height that is substantially the same as the height of the base frame.

In accordance with the vacuum support apparatus, the one or more baffle members are spatially orientated in the recess region to extend vertically from the interior surface of the bottom wall towards the interior bottom surface of the cover member.

In accordance with the vacuum support apparatus, the one or more baffle members are spatially oriented in the recess region to extend vertically from the interior surface of the bottom wall of the base frame in a manner which facilitates engaged contact with the bottom interior surface of the cover member to thereby provide support of the cover member.

In accordance with the vacuum support apparatus, the cover member comprises one or more layers of a semi-permeable material to facilitate fluid communication between the recessed region and the cover member in a manner which supports, maintains, or otherwise anchors one or more workpieces on the gripping support surface when the negative pressure is induced in the recessed region by the vacuum source.

In accordance with the vacuum support apparatus, the gripping support surface of the cover member comprises one or more layers of a semi-permeable material to facilitate fluid communication between the recessed region and the cover member in a manner which supports, maintains, or otherwise anchors one or more workpieces on the gripping support surface when the negative pressure is induced in the recessed region by the vacuum source.

In an exemplary embodiment, a vacuum support system comprises one or more of the following: a vacuum source; and a vacuum support apparatus that includes: a base frame having a recessed region for fluidic communication with a vacuum source and one or more support members arranged in the recessed region; a cover member supported on the base frame, the cover member having a gripping support surface to support and maintain or otherwise anchor one or more workpieces thereon via negative air pressure induced in the recessed region by the vacuum source; and one or more support members arranged in the recessed region.

In accordance with the vacuum support system, the base frame comprises one or more sidewalls and a bottom wall that define the recessed region.

In accordance with the vacuum support system, the one or more sidewalls are operable to support the cover member at a periphery of the vacuum support apparatus and the one or more support members are operable to support the cover member at the recessed region.

In accordance with the vacuum support system, the base frame is formed from a nonporous material.

In accordance with the vacuum support system, an upper peripheral surface of the base frame includes one or more grooves sized to receive one or more seal members in a manner which establishes a seal between the base frame and the cover member.

In accordance with the vacuum support system, the one or more support members and the bottom wall of the base frame comprise an integrally-formed monolithic structure.

In accordance with the vacuum support system, the one or more support members extend from an interior surface of the bottom wall.

In accordance with the vacuum support system, the one or more support members are spatially oriented in the recess region to extend vertically from the interior surface of the bottom wall of the base frame in a manner which facilitates engaged contact with the bottom interior surface of the cover member to thereby provide support of the cover member.

In accordance with the vacuum support system, the one or more support members are spaced apart from each other to form an array that influences the negative pressure induced in the recessed region by the vacuum source.

In accordance with the vacuum support system, the one or more support members have different structural configurations.

In accordance with the vacuum support system, the one or more support members have the same structural configuration.

In accordance with the vacuum support system, one or more baffle members are arranged in the recessed region to enhance the negative pressure effect induced in the recessed region by the vacuum source.

In accordance with the vacuum support system, the one or more baffle members have a height that is substantially the same as the height of the base frame.

In accordance with the vacuum support system, the one or more baffle members are spatially orientated in the recess region to extend vertically from the interior surface of the bottom wall towards the interior bottom surface of the cover member.

In accordance with the vacuum support system, the one or more baffle members are spatially oriented in the recess region to extend vertically from the interior surface of the bottom wall of the base frame in a manner which facilitates engaged contact with the bottom interior surface of the cover member to thereby provide support of the cover member.

In accordance with the vacuum support system, the cover member comprises one or more layers of a semi-permeable material to facilitate fluid communication between the recessed region and the cover member in a manner which supports, maintains, or otherwise anchors one or more workpieces on the gripping support surface when the negative pressure is induced in the recessed region by the vacuum source.

In accordance with the vacuum support system, the gripping support surface of the cover member comprises one or more layers of a semi-permeable material to facilitate fluid communication between the recessed region and the cover member in a manner which supports, maintains, or otherwise anchors one or more workpieces on the gripping support surface when the negative pressure is induced in the recessed region by the vacuum source.

In an exemplary embodiment, a modular vacuum support system comprises one or more of the following: a plurality of vacuum support apparatus to support one or more workpieces, each vacuum support apparatus in the plurality of vacuum support apparatus including: a base frame having a recessed region for fluidic communication with a vacuum source and one or more support members arranged in the recessed region; a cover member supported on the base frame, the cover member having a gripping support surface to support and maintain or otherwise anchor one or more workpieces thereon via negative air pressure induced in the recessed region by the vacuum source; and one or more support members arranged in the recessed region.

In accordance with the modular vacuum support system, the base frame comprises one or more sidewalls and a bottom wall that define the recessed region.

In accordance with the modular vacuum support system, the one or more sidewalls are operable to support the cover member at a periphery of the vacuum support apparatus and the one or more support members are operable to support the cover member at the recessed region.

In accordance with the modular vacuum support system, the base frame is formed from a nonporous material.

In accordance with the modular vacuum support system, an upper peripheral surface of the base frame includes one or more grooves sized to receive one or more seal members in a manner which establishes a seal between the base frame and the cover member.

In accordance with the modular vacuum support system, the one or more support members and the bottom wall of the base frame comprise an integrally-formed monolithic structure.

In accordance with the modular vacuum support system, the one or more support members extend from an interior surface of the bottom wall.

In accordance with the modular vacuum support system, the one or more support members are spatially oriented in the recess region to extend vertically from the interior surface of the bottom wall of the base frame in a manner which facilitates engaged contact with the bottom interior surface of the cover member to thereby provide support of the cover member.

In accordance with the modular vacuum support system, the one or more support members are spaced apart from each other to form an array that influences the negative pressure induced in the recessed region by the vacuum source.

In accordance with the modular vacuum support system, the one or more support members have different structural configurations.

In accordance with the modular vacuum support system, the one or more support members have the same structural configuration.

In accordance with the modular vacuum support system, one or more baffle members are arranged in the recessed region to enhance the negative pressure effect induced in the recessed region by the vacuum source.

In accordance with the modular vacuum support system, the one or more baffle members have a height that is substantially the same as the height of the base frame.

In accordance with the modular vacuum support system, the one or more baffle members are spatially orientated in the recess region to extend vertically from the interior surface of the bottom wall towards the interior bottom surface of the cover member.

In accordance with the modular vacuum support system, the one or more baffle members are spatially oriented in the recess region to extend vertically from the interior surface of the bottom wall of the base frame in a manner which facilitates engaged contact with the bottom interior surface of the cover member to thereby provide support of the cover member.

In accordance with the modular vacuum support system, the cover member comprises one or more layers of a semi-permeable material to facilitate fluid communication between the recessed region and the cover member in a manner which supports, maintains, or otherwise anchors one or more workpieces on the gripping support surface when the negative pressure is induced in the recessed region by the vacuum source.

In accordance with the modular vacuum support system, the gripping support surface of the cover member comprises one or more layers of a semi-permeable material to facilitate fluid communication between the recessed region and the cover member in a manner which supports, maintains, or otherwise anchors one or more workpieces on the gripping support surface when the negative pressure is induced in the recessed region by the vacuum source.

In an exemplary embodiment, a method for anchoring a workpiece comprises one or more of the following: sealingly connecting a cover member having a gripping support surface on a base frame having a recessed region and one or more support members arranged in the recessed region; placing the base frame in fluidic communication with a vacuum source; placing the workpiece on the gripping support surface; and inducing negative pressure in the recessed region to anchor the workpiece on the gripping support surface.

In an exemplary embodiment, a method for anchoring a workpiece comprises one or more of the following: sealingly connecting a cover member having a gripping support surface on a base frame having a recessed region and one or more support members arranged in the recessed region; placing the workpiece on the gripping support surface; inducing negative pressure in the recessed region to anchor the workpiece on the gripping support surface.

In accordance with each, respective method, the base frame comprises one or more sidewalls and a bottom wall that define the recessed region.

In accordance with each, respective method, the one or more sidewalls are operable to support the cover member at a periphery of the vacuum support apparatus and the one or more support members are operable to support the cover member at the recessed region.

In accordance with each, respective method, the base frame is formed from a nonporous material.

In accordance with each, respective method, an upper peripheral surface of the base frame includes one or more grooves sized to receive one or more seal members in a manner which establishes a seal between the base frame and the cover member.

In accordance with each, respective method, the one or more support members and the bottom wall of the base frame comprise an integrally-formed monolithic structure.

In accordance with each, respective method, the one or more support members extend from an interior surface of the bottom wall.

In accordance with each, respective method, the one or more support members are spatially oriented in the recess region to extend vertically from the interior surface of the bottom wall of the base frame in a manner which facilitates engaged contact with the bottom interior surface of the cover member to thereby provide support of the cover member.

In accordance with each, respective method, the one or more support members are spaced apart from each other to form an array that influences the negative pressure induced in the recessed region by the vacuum source.

In accordance with each, respective method, the one or more support members have different structural configurations.

In accordance with each, respective method, the one or more support members have the same structural configuration.

In accordance with each, respective method, one or more baffle members are arranged in the recessed region to enhance the negative pressure effect induced in the recessed region by the vacuum source.

In accordance with each, respective method, the one or more baffle members have a height that is substantially the same as the height of the base frame.

In accordance with each, respective method, the one or more baffle members are spatially orientated in the recess region to extend vertically from the interior surface of the bottom wall towards the interior bottom surface of the cover member.

In accordance with each, respective method, the one or more baffle members are spatially oriented in the recess region to extend vertically from the interior surface of the bottom wall of the base frame in a manner which facilitates engaged contact with the bottom interior surface of the cover member to thereby provide support of the cover member.

In accordance with each, respective method, the cover member comprises one or more layers of a semi-permeable material to facilitate fluid communication between the recessed region and the cover member in a manner which supports, maintains, or otherwise anchors one or more workpieces on the gripping support surface when the negative pressure is induced in the recessed region by the vacuum source.

In accordance with each, respective method, the gripping support surface of the cover member comprises one or more layers of a semi-permeable material to facilitate fluid communication between the recessed region and the cover member in a manner which supports, maintains, or otherwise anchors one or more workpieces on the gripping support surface when the negative pressure is induced in the recessed region by the vacuum source.

BRIEF DESCRIPTION OF DRAWINGS

The various advantages of the examples of the present disclosure will become apparent to one skilled in the art by reading the following specification and appended claims, and by referencing the following drawings, in which:

DESCRIPTION

Examples set forth herein provide an enhanced vacuum support system and vacuum support apparatus to anchor one or more workpieces during a manufacturing process. The enhanced vacuum support system and vacuum support apparatus includes an enhanced design that maintains negative pressure therein in a manner that anchors one or more workpieces (even irregular-shaped workpieces) thereon.

Figure 1:
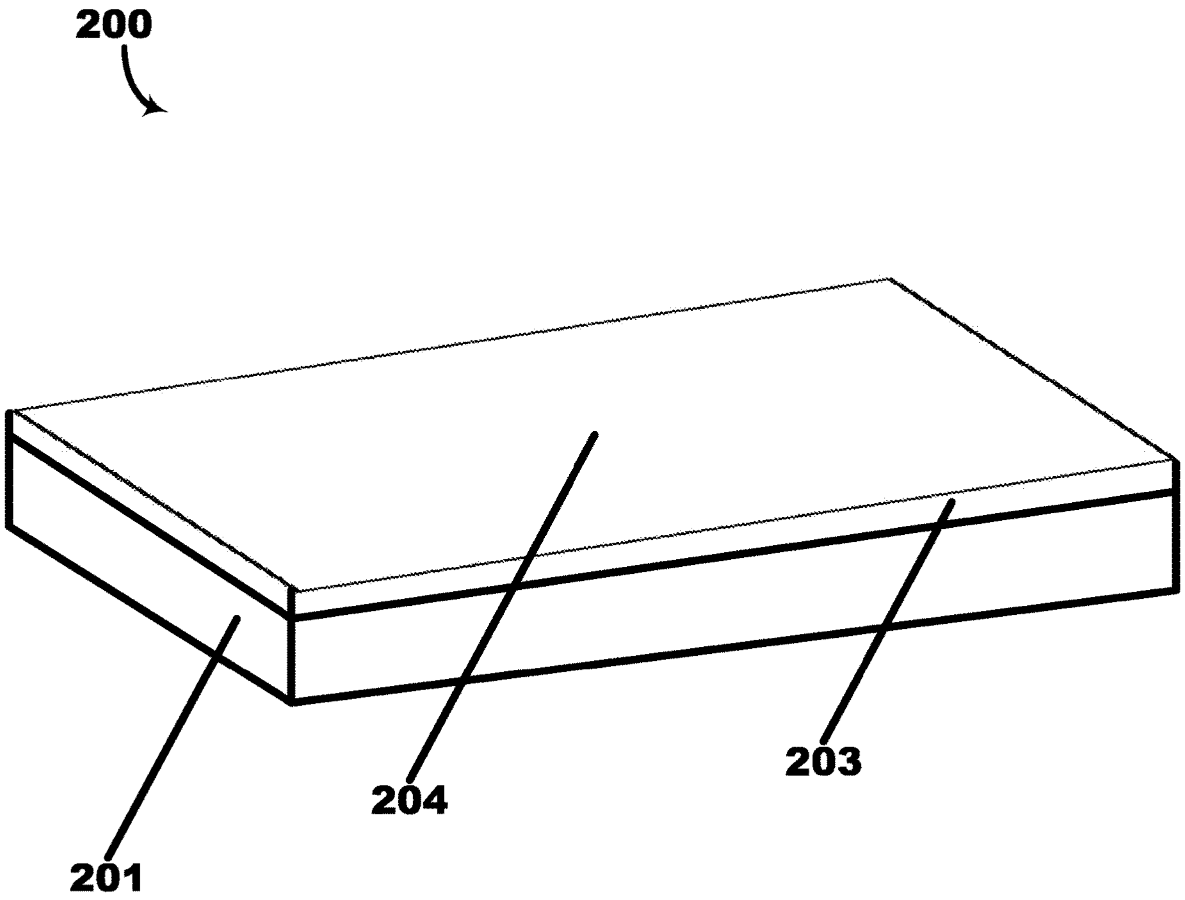
FIG. 1 illustrates a perspective view of an advantageous embodiment of a vacuum support apparatus.
Figure 2:
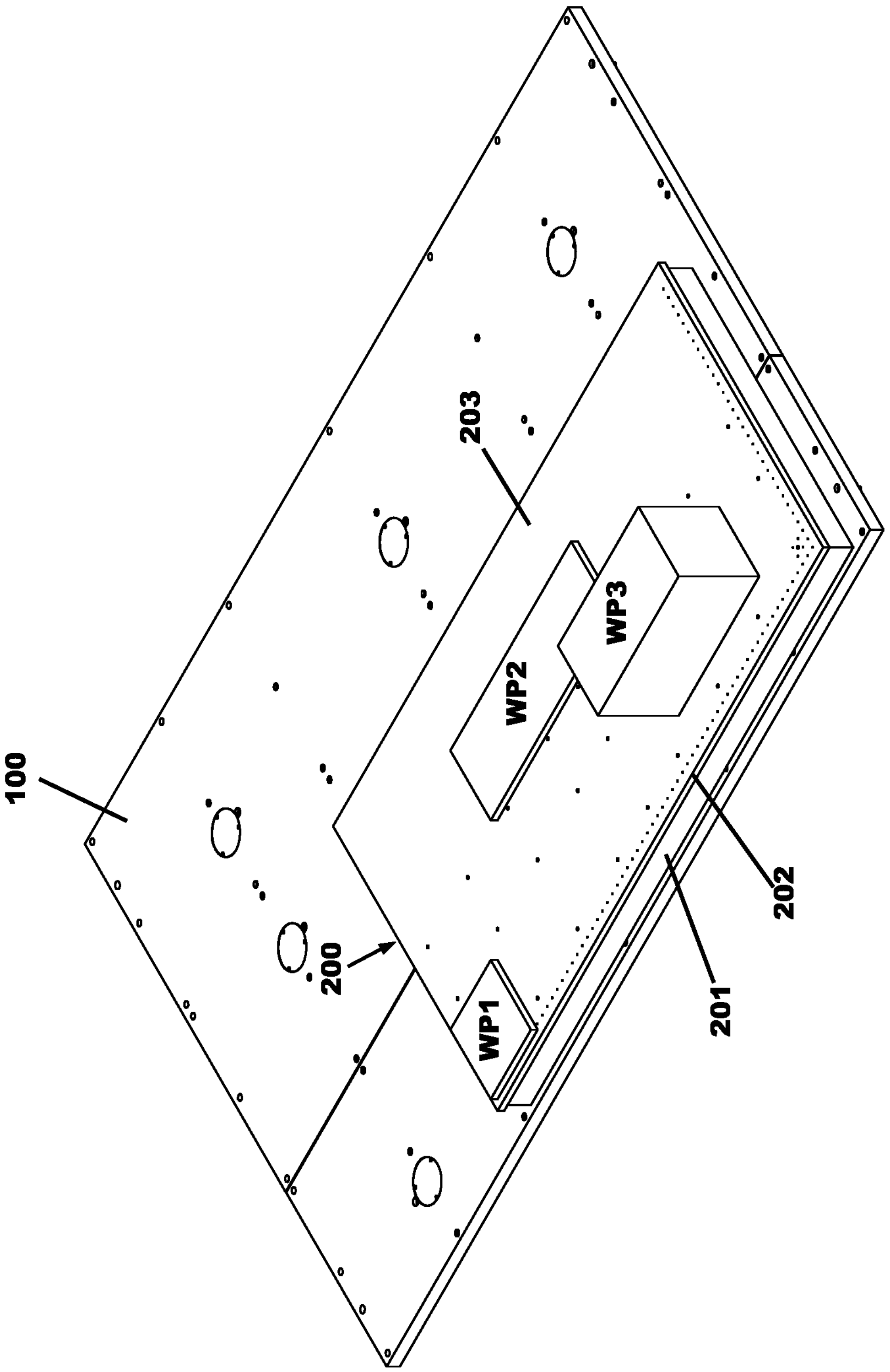
FIG. 2 illustrates a perspective view of an advantageous embodiment of a vacuum support apparatus having a plurality of workpieces anchored thereon.
Figure 3:
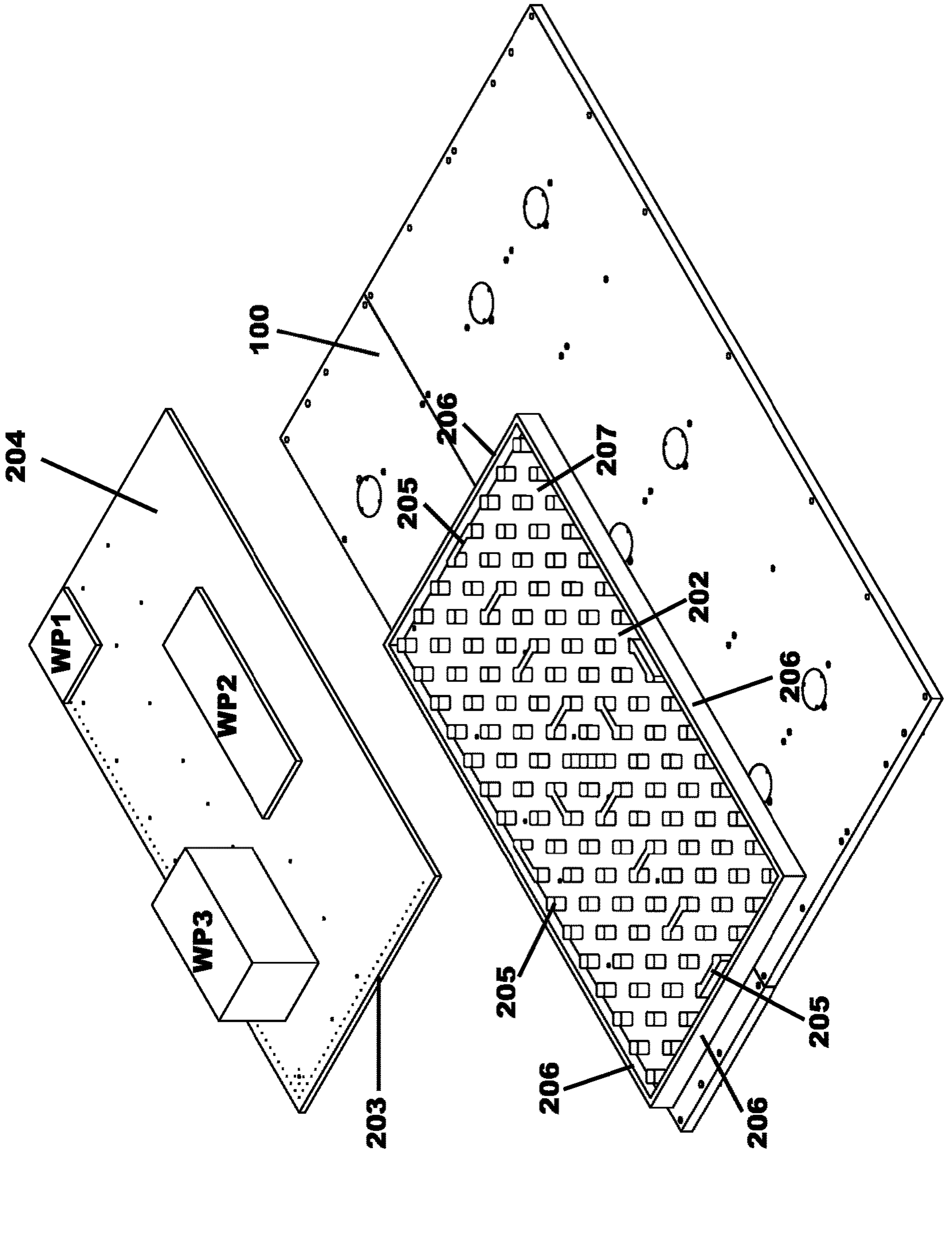
FIG. 3 illustrates a perspective view of the vacuum support apparatus of FIG. 2 with the cover member removed from the base frame.

In the illustrated exemplary embodiment of FIGS. 1 through 3, a vacuum support apparatus 200 is supported on a support bed 100 (or a riser or framework), the vacuum support apparatus 200 including a base frame 201 and a cover member 203 supported on the base frame 201. In the exemplary embodiments, the cover member 203 is mechanically coupled or fixed to the base frame 201 via one or more set of mechanical fasteners at the periphery of the base frame 201 and the cover member 203. The base frame 201 itself is mechanically coupled or fixed to the support bed 100 via one or more set of mechanical fasteners.

Figure 5:
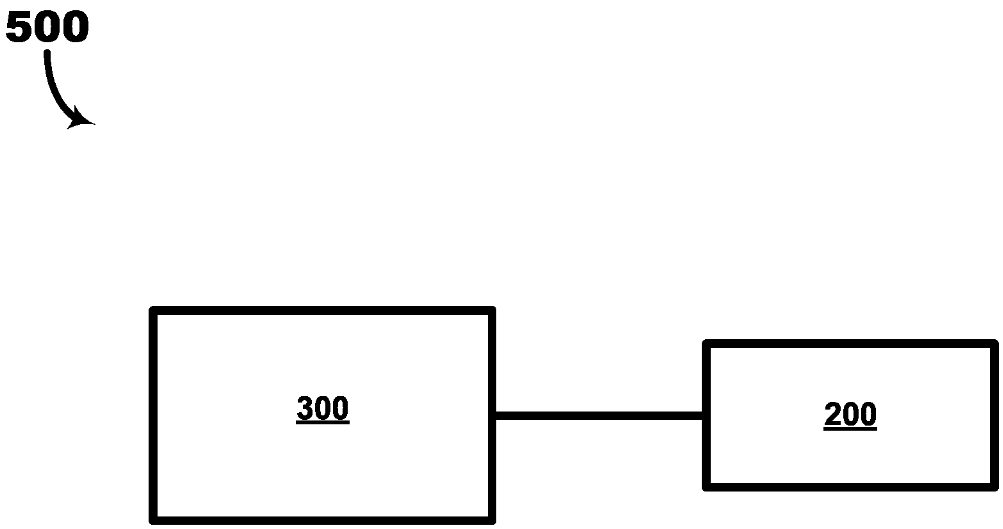
FIG. 5 illustrates a block diagram of an advantageous embodiment of a vacuum support system.

The base frame 201 comprises one or more sidewalls 206 and a bottom wall 207 that collectively define a recessed region 202 that in operation is in fluidic communication with a vacuum source 300 such as a vacuum device that is operable to generate negative pressure (See FIG. 5). In order to establish fluidic communication with the vacuum source 300, a selective one of the one or more sidewalls 206 and/or the bottom wall 207 may include an inlet to establish a fluidic connection with the vacuum source 300.

Although the illustrated exemplary embodiments show the base frame 201 having a generally rectangular three-dimensional (3D) shape or configuration, embodiments are not limited thereto. This disclosure contemplates forming the base frame 201 having any 3D shape or configuration that falls within the spirit and scope of the principles of this disclosure. An upper peripheral surface of the one or more sidewalls 206 of the base frame 206 includes one or more grooves sized to receive one or more seal members in a manner which establishes and maintains a seal between the base frame 201 and the cover member 203 when negative pressure is induced in in the recessed region 202 by the vacuum source 300.

The base frame 201 further comprises one or more support members 205 that extend or otherwise project from an interior surface of the bottom wall 206 in the recessed region 202. In particular, the one or more support members 205 are machined in-place from the bottom wall 206 of the base frame 201 to form an integrally-formed monolithic structure. In an exemplary embodiment, the integrally-formed multi-property monolithic structure is fabricated via additive manufacturing (3D Printing). The one or more support members 205 are spatially oriented in the recess region 202 to project or otherwise extend vertically from the interior surface of the bottom wall 206 in a manner which facilitates engaged contact with the bottom interior surface of the cover member 203 when the cover member 203 is placed in an operating position on the base frame 201. In that way, when negative pressure is induced in the recessed region 202, the cover member 203 is robustly supported at peripheral regions thereof by the one or more sidewalls 206 and also at interior regions thereof by the one or more support members 205. Such a configuration serves to maintain the structural integrity of the cover member 203 by preventing a waving condition of the cover member 203. Meaning, the one or more support members 205 and the one or more sidewalls 206 provide structural support which prevents the sinking of the cover member 203 in a direction towards the recessed region 202 in response to the weight of the one or more workpieces supported thereon and also by the negative pressure within the recessed region 202. The one or more support members 205 also serve to effect airflow through the recessed region 202. In the exemplary embodiments, one or more mechanical fasteners may be set at some of the one or more support members 205 to mechanically couple the cover member 203 to the base frame 201.

Figure 4:
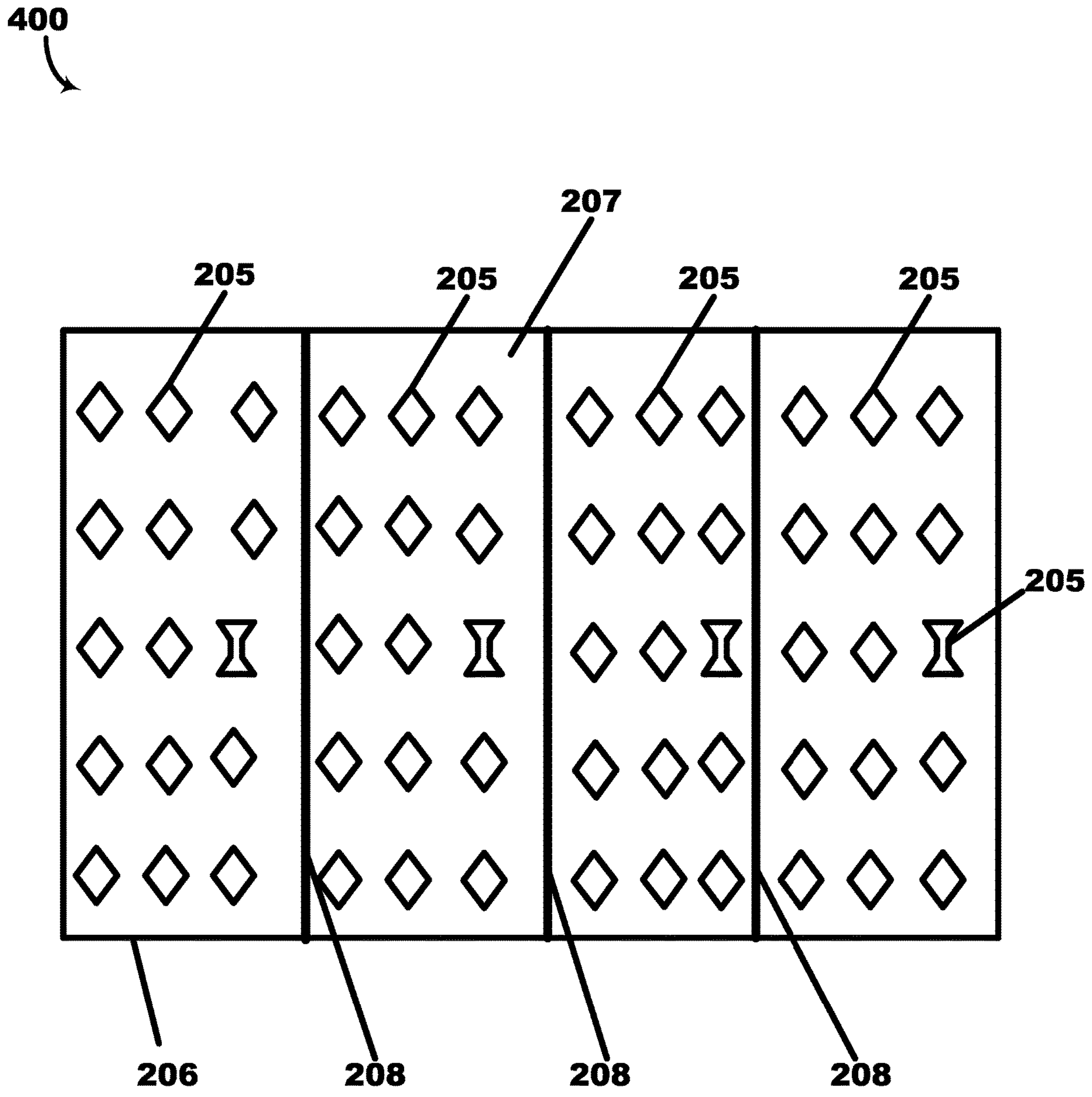
FIG. 4 illustrates a top view of an advantageous embodiment of a vacuum support apparatus having a plurality of baffle members.

In the illustrated exemplary embodiments of FIGS. 3 and 4, the one or more support members 205 are spaced apart from each other to form a generally symmetrical array. In one exemplary embodiment, the one or more support members 205 are spaced apart a predetermined distance from neighboring support members 205. Such a spatial arrangement serves to maintain a consistent application of negative pressure in the recessed region. Alternatively, the one or more support members 205 are spaced apart a random distance from neighboring support members 205 to form a generally asymmetrical array.

Although in the illustrated exemplary embodiments of FIGS. 3 and 4, the one or more support members 205 have different structural configurations, embodiments are not limited thereto. This disclosure contemplates forming the one or more support members 205 having the same structural configuration.

In order to enhance the performance of the vacuum support apparatus 200 by maintaining the distribution of negative pressure generated by the vacuum source 300 across the entire recessed region, the base frame 201, including the one or more support members 205, is formed of a non-porous material. Exemplary materials include, but are not limited to, metals, high-density foams (HDFs), polymers, and combinations thereof. Embodiments, however, are not limited thereto, and thus, this disclosure contemplates forming the base frame 201 using any suitable material that falls within the spirit and scope of the principles of this disclosure.

In the exemplary embodiment of FIGS. 1 through 3, the cover member 203 comprises a gripping support surface 204 to support and maintain or otherwise anchor one or more workpieces WP1, WP2, WP3 thereon when negative air pressure is induced in the recessed region 202 by the vacuum source 300. In an exemplary embodiment, the cover member 203 comprises a composite material having one or more layers of a semi-permeable material to facilitate fluid communication between the recessed region 202 and the cover member 203 in a manner which supports, maintains, or otherwise anchors one or more workpieces WP1, WP2, WP3 on the gripping support surface 204 when negative pressure is induced in the recessed region 202 by the vacuum source 300. Alternatively or additionally, the gripping support surface 204 comprises one or more layers of a semi-permeable material, while the remaining regions of the cover member 203 comprise a non-porous material. In an exemplary embodiment, such a semi-permeable material comprises an engineered wood such as medium-density fibreboard (MDF). Embodiments, however, are not limited thereto. This disclosure contemplates forming the cover member 203 using any suitable semi-permeable material that falls within the spirit and scope of the principles of this disclosure.

Alternatively or additionally, the gripping support surface 204 may comprise an anti-slip material such as, for example, silicon. The anti-slip material should have a coefficient of friction that inhibits movement of the one or more workpieces WP1, WP2, WP3 by increasing an amount of friction between the gripping support surface 204 and the one or more workpieces WP1, WP2, WP3. In this way, the one or more workpieces WP1, WP2, WP3 are further anchored or otherwise maintained on the gripping support surface 204.

In the illustrated exemplary embodiment of FIG. 4, one or more baffle members 208 are arranged spaced apart from each other in the recessed region 202 to enhance the negative pressure effect induced in the recessed region 202 by the vacuum source 300. In particular, the one or more baffle members 208 form partitions within the recessed region that maintain the integrity of negative pressure in the recessed region 202. The one or more baffle members 208 are spatially orientated in the recess region to extend vertically from the interior surface of the bottom wall 207 towards the interior bottom surface of the cover member 203, and thus, has a height that is substantially commensurate to the height of the base frame 201. In that way, the one or more baffle members 208 may have engaged contact with the bottom interior surface of the cover member 203 when the cover member 203 is placed on the base frame 201.

In the illustrated exemplary embodiment of FIG. 5, a vacuum support system 500 comprises a vacuum source 300 in fluidic communication with the vacuum support apparatus 200 having the architecture set forth and described herein.

Figure 6:
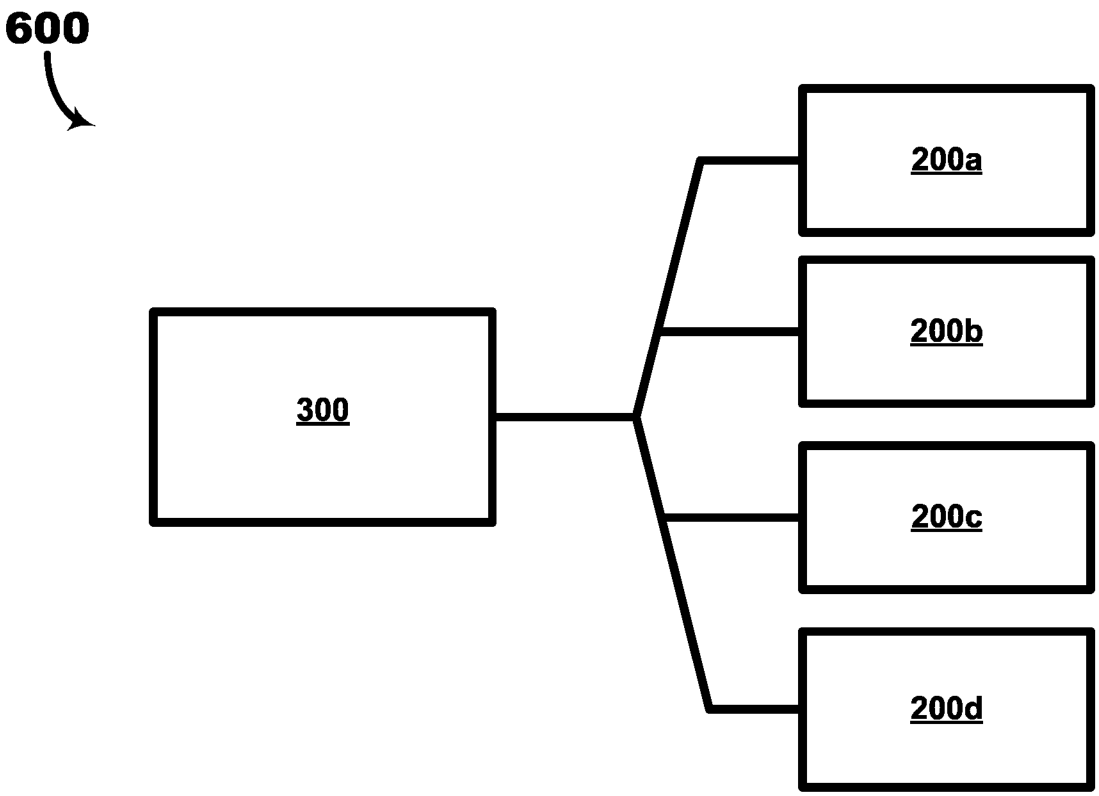
FIG. 6 illustrates a block diagram of an advantageous embodiment of a modular vacuum support system having a plurality of vacuum support apparatus in parallel fluidic communication with a vacuum source.

In the illustrated exemplary embodiment of FIG. 6, a modular vacuum support system 600 comprises a vacuum source 300 in fluidic communication with a plurality of vacuum support apparatus 200*a*, 200*b*, 200*c*, 200*d* each having the architecture set forth and described herein. In an exemplary embodiment, each vacuum support apparatus 200*a*, 200*b*, 200*c*, 200*d* in the plurality of vacuum support apparatus 200*a*, 200*b*, 200*c*, 200*d* is mounted on a riser or framework (not illustrated). The plurality of vacuum support apparatus 200*a*, 200*b*, 200*c*, 200*d* are arranged in parallel fluidic communication with a single vacuum source 300. Due to the modular arrangement, the plurality of vacuum support apparatus 200*a*, 200*b*, 200*c*, 200*d* can be positioned in any configuration that accommodates the size and/or shape of the one or more workpieces WP1, WP2, WP3 while also optimizing the functionality of the modular vacuum support system 600.

Figure 7:
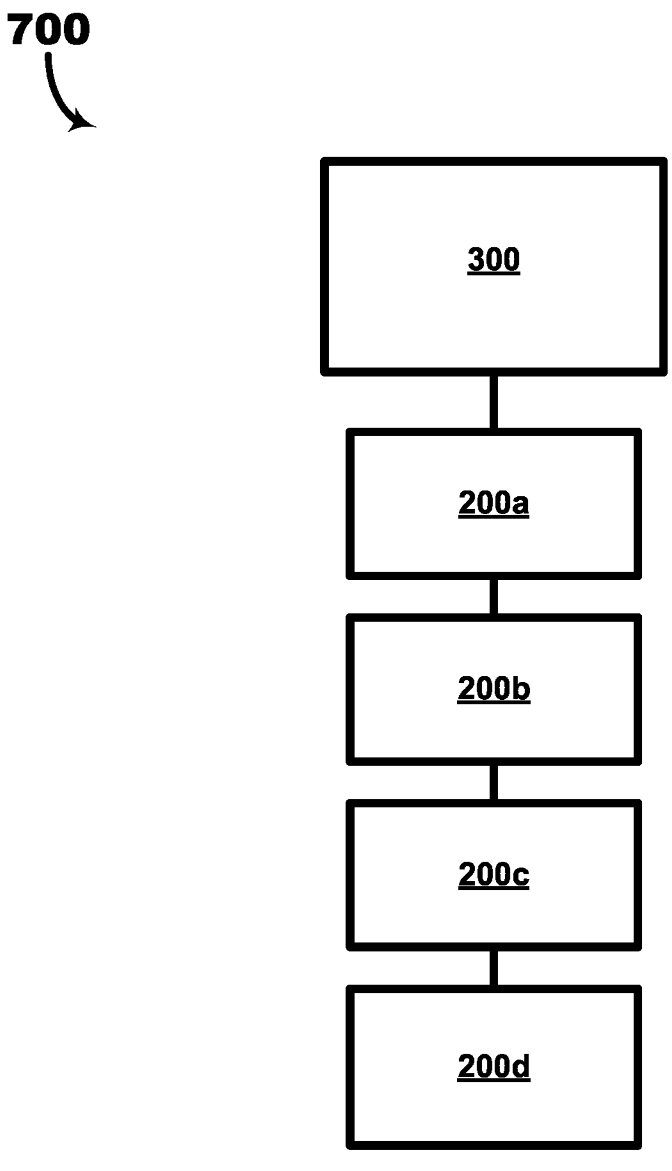
FIG. 7 illustrates a block diagram of an advantageous embodiment of a modular vacuum support system having a plurality of vacuum support apparatus in series fluidic communication with a vacuum source.

In the illustrated exemplary embodiment of FIG. 7, a modular vacuum support system 700 comprises a vacuum source 300 in fluidic communication with a plurality of vacuum support apparatus 200*a*, 200*b*, 200*c*, 200*d* each having the architecture set forth and described herein. In an exemplary embodiment, each vacuum support apparatus 200*a*, 200*b*, 200*c*, 200*d* in the plurality of vacuum support apparatus 200*a*, 200*b*, 200*c*, 200*d* is mounted on a riser or framework (not illustrated). The plurality of vacuum support apparatus 200*a*, 200*b*, 200*c*, 200*d* are arranged in series fluidic communication with a single vacuum source 300. Due to the modular arrangement, the plurality of vacuum support apparatus 200*a*, 200*b*, 200*c*, 200*d* can be positioned in any configuration that accommodates the size and/or shape of the one or more workpieces WP1, WP2, WP3 while also optimizing the functionality of the modular vacuum support system 700.

Figure 8:
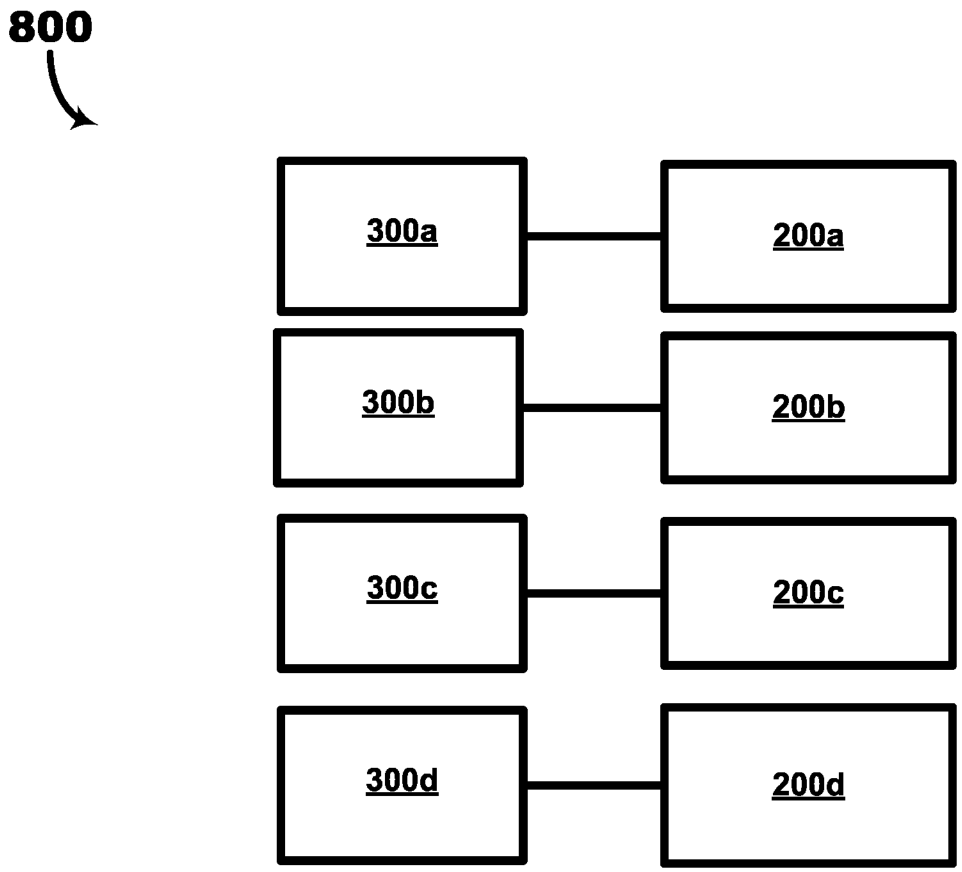
FIG. 8 illustrates a block diagram of an advantageous embodiment of a modular vacuum support system having a plurality of vacuum support apparatus in fluidic communication with a corresponding vacuum source.

In the illustrated exemplary embodiment of FIG. 8, a modular vacuum support system 800 comprises a vacuum source 300 in fluidic communication with a plurality of vacuum support apparatus 200*a*, 200*b*, 200*c*, 200*d* each having the architecture set forth and described herein. In an exemplary embodiment, each vacuum support apparatus 200*a*, 200*b*, 200*c*, 200*d* in the plurality of vacuum support apparatus 200*a*, 200*b*, 200*c*, 200*d* is mounted on a riser or framework (not illustrated). The plurality of vacuum support apparatus 200*a*, 200*b*, 200*c*, 200*d* are arranged in parallel fluidic communication with a corresponding vacuum source 300*a*, 300*b*, 300*c*, 300*d*. Due to the modular arrangement, the plurality of vacuum support apparatus 200*a*, 200*b*, 200*c*, 200*d* can be positioned in any configuration that accommodates the size and/or shape of the one or more workpieces WP1, WP2, WP3 while also optimizing the functionality of the modular vacuum support system 800.

Figure 9:
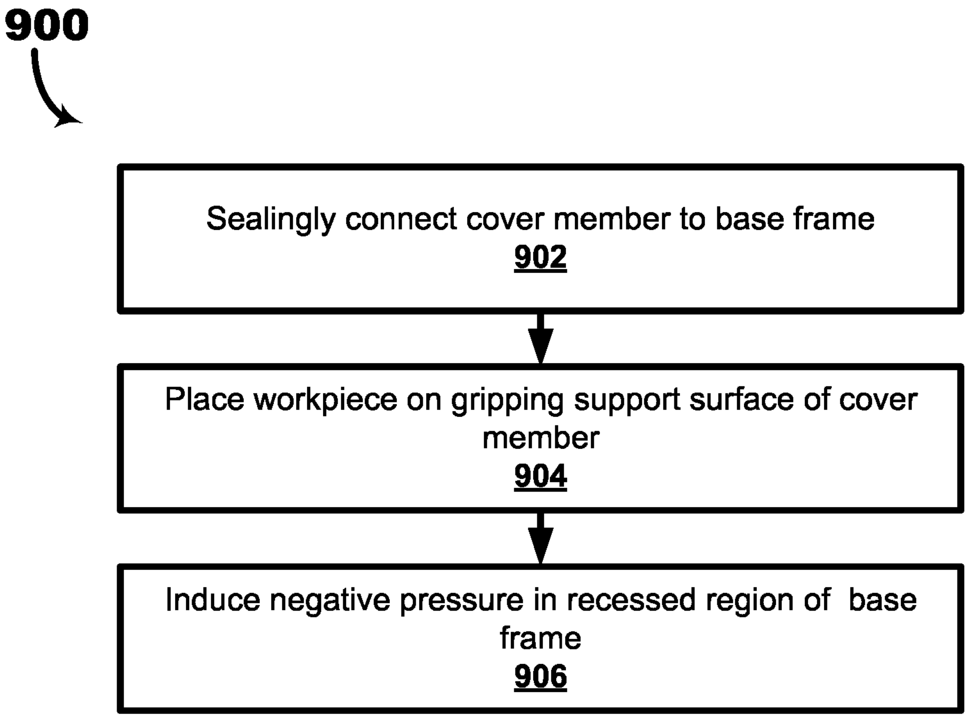
FIGS. 9 and 10 respectively illustrate advantageous embodiments of a method for anchoring a workpiece.

In the illustrated exemplary embodiment of FIG. 9, a method 900 for anchoring a workpiece on a support surface is provided.

Illustrated process block 902 includes sealingly connecting a cover member having a gripping support surface on a base frame having a recessed region and one or more support members arranged in the recessed region.

In accordance with the method 900, the base frame comprises one or more sidewalls and a bottom wall that define the recessed region.

In accordance with the method 900, the one or more sidewalls are operable to support the cover member at a periphery of the vacuum support apparatus and the one or more support members are operable to support the cover member at the recessed region.

In accordance with the method 900, the base frame is formed from a nonporous material.

In accordance with the method 900, an upper peripheral surface of the base frame includes one or more grooves sized to receive one or more seal members in a manner which establishes a seal between the base frame and the cover member.

In accordance with the method 900, the one or more support members and the bottom wall of the base frame comprise an integrally-formed monolithic structure.

In accordance with the method 900, the one or more support members extend from an interior surface of the bottom wall.

In accordance with the method 900, the one or more support members are spatially oriented in the recess region to extend vertically from the interior surface of the bottom wall of the base frame in a manner which facilitates engaged contact with the bottom interior surface of the cover member to thereby provide support of the cover member.

In accordance with the method 900, the one or more support members are spaced apart from each other to form an array that influences the negative pressure induced in the recessed region by the vacuum source.

In accordance with the method 900, the one or more support members have different structural configurations.

In accordance with the method 900, the one or more support members have the same structural configuration.

In accordance with the method 900, one or more baffle members are arranged in the recessed region to enhance the negative pressure effect induced in the recessed region by the vacuum source.

In accordance with the method 900, the one or more baffle members have a height that is substantially the same as the height of the base frame.

In accordance with the method 900, the one or more baffle members are spatially orientated in the recess region to extend vertically from the interior surface of the bottom wall towards the interior bottom surface of the cover member.

In accordance with the method 900, the one or more baffle members are spatially oriented in the recess region to extend vertically from the interior surface of the bottom wall of the base frame in a manner which facilitates engaged contact with the bottom interior surface of the cover member to thereby provide support of the cover member.

In accordance with the method 900, the cover member comprises one or more layers of a semi-permeable material to facilitate fluid communication between the recessed region and the cover member in a manner which supports, maintains, or otherwise anchors one or more workpieces on the gripping support surface when the negative pressure is induced in the recessed region by the vacuum source.

In accordance with the method 900, the gripping support surface of the cover member comprises one or more layers of a semi-permeable material to facilitate fluid communication between the recessed region and the cover member in a manner which supports, maintains, or otherwise anchors one or more workpieces on the gripping support surface when the negative pressure is induced in the recessed region by the vacuum source.

The method 900 may then proceed to illustrated process block 904, which includes placing the workpiece on the gripping support surface.

The method 900 may then proceed to illustrated process block 906, which includes inducing negative pressure in the recessed region to anchor the workpiece on the gripping support surface.

The method 900 can terminate or end after execution of process block 906.

Figure 10:
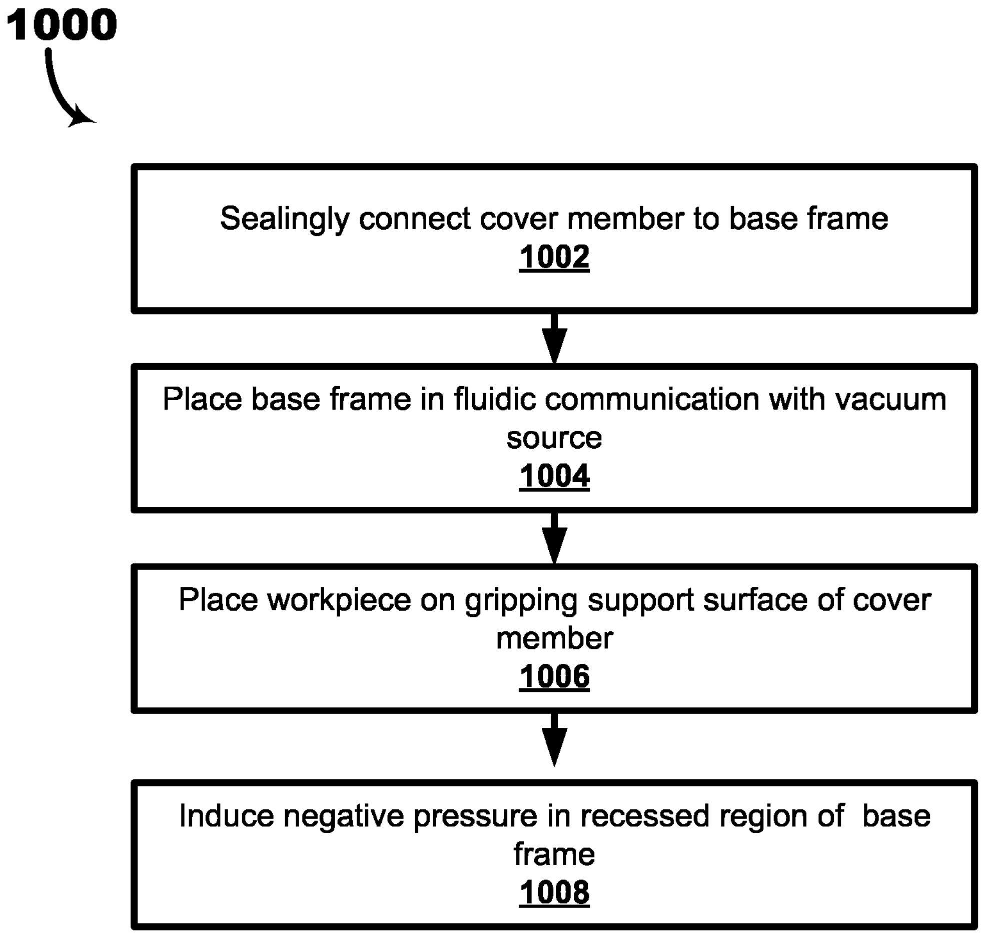

In the illustrated exemplary embodiment of FIG. 10, a method 1000 for anchoring a workpiece on a support surface is provided.

Illustrated process block 1002 includes sealingly connecting a cover member having a gripping support surface on a base frame having a recessed region and one or more support members arranged in the recessed region.

In accordance with the method 1000, the base frame comprises one or more sidewalls and a bottom wall that define the recessed region.

In accordance with the method 1000, the one or more sidewalls are operable to support the cover member at a periphery of the vacuum support apparatus and the one or more support members are operable to support the cover member at the recessed region.

In accordance with the method 1000, the base frame is formed from a nonporous material.

In accordance with the method 1000, an upper peripheral surface of the base frame includes one or more grooves sized to receive one or more seal members in a manner which establishes a seal between the base frame and the cover member.

In accordance with the method 1000, the one or more support members and the bottom wall of the base frame comprise an integrally-formed monolithic structure.

In accordance with the method 1000, the one or more support members extend from an interior surface of the bottom wall.

In accordance with the method 1000, the one or more support members are spatially oriented in the recess region to extend vertically from the interior surface of the bottom wall of the base frame in a manner which facilitates engaged contact with the bottom interior surface of the cover member to thereby provide support of the cover member.

In accordance with the method 1000, the one or more support members are spaced apart from each other to form an array that influences the negative pressure induced in the recessed region by the vacuum source.

In accordance with the method 1000, the one or more support members have different structural configurations.

In accordance with the method 1000, the one or more support members have the same structural configuration.

In accordance with the method 1000, one or more baffle members are arranged in the recessed region to enhance the negative pressure effect induced in the recessed region by the vacuum source.

In accordance with the method 1000, the one or more baffle members have a height that is substantially the same as the height of the base frame.

In accordance with the method 1000, the one or more baffle members are spatially orientated in the recess region to extend vertically from the interior surface of the bottom wall towards the interior bottom surface of the cover member.

In accordance with the method 1000, the one or more baffle members are spatially oriented in the recess region to extend vertically from the interior surface of the bottom wall of the base frame in a manner which facilitates engaged contact with the bottom interior surface of the cover member to thereby provide support of the cover member.

In accordance with the method 1000, the cover member comprises one or more layers of a semi-permeable material to facilitate fluid communication between the recessed region and the cover member in a manner which supports, maintains, or otherwise anchors one or more workpieces on the gripping support surface when the negative pressure is induced in the recessed region by the vacuum source.

In accordance with the method 1000, the gripping support surface of the cover member comprises one or more layers of a semi-permeable material to facilitate fluid communication between the recessed region and the cover member in a manner which supports, maintains, or otherwise anchors one or more workpieces on the gripping support surface when the negative pressure is induced in the recessed region by the vacuum source.

The method 1000 may then proceed to illustrated process block 1004, which includes placing the base frame in fluidic communication with a vacuum source.

The method 1000 may then proceed to illustrated process block 1006, which includes placing the workpiece on the gripping support surface.

The method 1000 may then proceed to illustrated process block 1008, which includes inducing negative pressure in the recessed region to anchor the workpiece on the gripping support surface.

The method 1000 can terminate or end after execution of process block 1008.

The terms “coupled,” “attached,” or “connected” used herein is to refer to any type of relationship, direct or indirect, between the components in question, and is to apply to electrical, mechanical, fluid, optical, electro-magnetic, electro-mechanical or other connections. Additionally, the terms “first,” “second,” etc. are used herein only to facilitate discussion, and carry no particular temporal or chronological significance unless otherwise indicated. The terms “cause” or “causing” means to make, force, compel, direct, command, instruct, and/or enable an event or action to occur or at least be in a state where such event or action is to occur, either in a direct or indirect manner.

Those skilled in the art will appreciate from the foregoing description that the broad techniques of the one or more embodiments of the present disclosure is to be implemented in a variety of forms. Therefore, while the present disclosure describes matters in connection with particular embodiments thereof, the true scope of the embodiments of the present disclosure should not be so limited since other modifications will become apparent to the skilled practitioner upon a study of the drawings, specification, and following claims.

What is claimed is:

1. A vacuum support apparatus that comprises a base frame that comprises:

a periphery of sidewalls that support and are mechanically fastened to a cover member and form a recessed region configured to induce a negative air pressure through a fluidic communication with a vacuum source, wherein:

the sidewalls comprise an upper peripheral surface that comprises grooves that hold a seal; and the cover member comprises a gripping support surface that comprises semi-permeable regions configured to anchor one or more workpieces thereon; and one or more support members arranged in the recessed region.

2. The vacuum support apparatus of claim 1, wherein the base frame comprises the sidewalls connected to a bottom wall that defines the recessed region.

3. The vacuum support apparatus of claim 1, wherein the sidewalls are non-permeable and configured to support the cover member at the periphery of the vacuum support apparatus.

4. The vacuum support apparatus of claim 2, wherein one or more support members extend up from the bottom wall as an integrally-formed monolithic structure configured to prevent a waving in the cover member and effect airflow through the recessed region.

5. The vacuum support apparatus of claim 1, wherein the one or more support members are spaced apart to form an array which supports the cover member at the recessed region.

6. The vacuum support apparatus of claim 1, further comprising one or more baffle members forming partitions in the recessed region to maintain an integrity of the negative air pressure in the recessed region.

7. The vacuum support apparatus of claim 1, wherein all regions of the gripping support surface comprise semi-permeable material and facilitate fluid communication between the recessed region and the cover member.

8. A vacuum support system, that comprises:

a vacuum source; and a support apparatus that includes:

a base frame that comprises:

a periphery of sidewalls that support and are mechanically fastened to a cover member and form a recessed region configured to induce a negative air pressure through a fluidic communication with the vacuum source, wherein:

the sidewalls comprise an upper peripheral surface that comprises grooves that hold a seal; and the cover member comprises a gripping support surface that comprises semi-permeable regions configured to anchor one or more workpieces thereon; and one or more support members arranged in the recessed region.

9. The vacuum support system of claim 8, wherein the base frame comprises the sidewalls connected to a bottom wall that defines the recessed region.

10. The vacuum support system of claim 8, wherein the sidewalls are non-permeable and configured to support the cover member at the periphery of the support apparatus.

11. The vacuum support system of claim 9, wherein one or more support members extend up from the bottom wall as an integrally-formed monolithic structure configured to prevent a waving in the cover member and effect airflow through the recessed region.

12. The vacuum support system of claim 8, wherein the one or more support members are spaced apart to form an array which supports the cover member at the recessed region.

13. The vacuum support system of claim 8, further comprising one or more baffle members forming partitions in the recessed region to maintain an integrity of the negative air pressure in the recessed region.

14. The vacuum support system of claim 8, wherein all regions of the gripping support surface comprise semi-permeable material and facilitate fluid communication between the recessed region and the cover member.

15. A modular vacuum support system, that comprises:

a vacuum source; and a plurality of vacuum support apparatus, each configured to support one or more workpieces, wherein each vacuum support apparatus in the plurality of vacuum support apparatus comprises:

a base frame that comprises:

a periphery of sidewalls that support and are mechanically fastened to a cover member and form a recessed region configured to induce a negative air pressure through a fluidic communication with the vacuum source, wherein:

the sidewalls comprise an upper peripheral surface that comprises grooves that hold a seal; and the cover member comprises a gripping support surface that comprises semi-permeable regions configured to anchor one or more workpieces thereon; and one or more support members arranged in the recessed region.

16. The modular vacuum support system of claim 15, wherein the plurality of vacuum support apparatus are in series fluidic communication with the vacuum source.

17. The modular vacuum support system of claim 15, wherein the plurality of vacuum support apparatus are in parallel fluidic communication with the vacuum source.

18. The modular vacuum support system of claim 15, wherein the base frame comprises the sidewalls connected to a bottom wall that defines the recessed region.

19. The modular vacuum support system of claim 15, wherein the sidewalls are non-permeable and configured to support the cover member at the periphery of the vacuum support apparatus.

20. The modular vacuum support system of claim 18, wherein one or more support members extend up from the bottom wall as an integrally-formed monolithic structure configured to prevent a waving in the cover member and effect airflow through the recessed region.

* * * * *